US006998618B2

(12) United States Patent
Twerdochlib

(10) Patent No.: US 6,998,618 B2
(45) Date of Patent: Feb. 14, 2006

(54) INTEGRAL CONDITION MONITOR FOR DETECTING OVERHEATING IN AN ELECTRIC GENERATOR

(75) Inventor: Michael Twerdochlib, Oviedo, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 307 days.

(21) Appl. No.: 10/669,846

(22) Filed: Sep. 24, 2003

(65) Prior Publication Data

US 2005/0063452 A1    Mar. 24, 2005

(51) Int. Cl.
*G01K 1/00*    (2006.01)
(52) U.S. Cl. .................................. 250/370.02; 374/152
(58) Field of Classification Search ........... 250/370.02, 250/370.01; 374/152; 62/96; 340/584
See application file for complete search history.

(56) References Cited

U.S. PATENT DOCUMENTS

| 4,698,756 | A | * | 10/1987 | Gonzalez et al. ........... 702/130 |
| 4,818,975 | A | * | 4/1989 | Jenkins ........................ 340/584 |
| 5,097,669 | A | * | 3/1992 | Hargrove et al. ............... 62/96 |
| 5,550,629 | A | * | 8/1996 | Shapanus et al. ............. 356/72 |
| 5,785,114 | A | * | 7/1998 | Armstrong et al. ........... 165/47 |
| 6,112,544 | A | * | 9/2000 | Blatter et al. ................. 62/434 |
| 6,513,972 | B1 | * | 2/2003 | Jenkins ........................ 374/161 |
| 6,527,440 | B1 | * | 3/2003 | Jenkins ........................ 374/161 |
| 6,707,179 | B1 | * | 3/2004 | Guttromson et al. .......... 310/52 |

* cited by examiner

*Primary Examiner*—David Porta
*Assistant Examiner*—Faye Polyzos

(57) ABSTRACT

The present invention provides a flange-mounted condition monitor (30) that can be mounted to an access flange (21) on an access opening (20) on the housing (13) of a generator (10). The condition monitor (30) forms an integral part of the generator (10) and eliminates the need for complex systems of pipes and valves for transferring hydrogen samples from the generator (10) to the condition monitor (30). The flange-mounted condition monitor (30) provides greater sensitivity to overheat conditions, significantly reducing the risk of dangerous hydrogen leaks and eliminating costs associated with installing and maintaining a remote condition monitor and also reducing or eliminating the false alarms associated with water that collects in the piping of a remote condition monitor.

22 Claims, 3 Drawing Sheets

INTEGRAL CONDITION MONITOR FOR DETECTING OVERHEATING IN AN ELECTRIC GENERATOR

FIELD OF THE INVENTION

The present invention relates to systems and apparatuses for monitoring an electric machine, and more particularly to an integral condition monitor for detecting overheating in an electric generator.

BACKGROUND

Because hydrogen has excellent cooling characteristics, it is often utilized to cool the internals of electric generators. FIG. 1 illustrates a conventional hydrogen-cooled generator 10. The generator 10 includes a rotor 11 and a stator 12 enclosed by a housing or shell 13. The rotor 11 generally includes a set of blades 14 for propelling hydrogen around the interior of the generator to promote cooling. The directed line segments in FIG. 1 illustrate typical flow patterns for hydrogen in a hydrogen-cooled generator.

Generators that utilize hydrogen for cooling often include a generator-condition monitor for detecting overheating within the generator. The condition monitor takes samples of hydrogen gas from the generator and monitors the samples for signs of overheating. When materials within the generator are heated sufficiently to cause thermal decomposition, the materials produce concentrations of sub-micron particles, referred to as pyrolytic products or pyrolytic particulates. The condition monitor can identify an overheat condition by detecting the presence of pyrolytic products in a hydrogen sample.

A significant problem with conventional generator-condition monitors is that the condition monitor remote from the generator and hydrogen samples must be conveyed to the monitor by a complex system of pipes and valves. This transfer of hydrogen away from the generator raises safety concerns by significantly extending the hydrogen zone. Although pure hydrogen is a non-explosive medium, it can become extremely dangerous when it is mixed with air. Therefore, the pipes and valves used to convey hydrogen samples to and from a remote condition monitor must be specially designed to carefully guard against hydrogen leaks, which adds significant cost and complexity to an electric generator.

SUMMARY OF THE INVENTION

With the foregoing in mind, systems and apparatuses consistent with the present invention provide an improved condition monitor that forms an integral part of an electric generator by being mounted to an access flange a part of the electric generator. The integral design provides a condition monitor with greater sensitivity to pyrolytic products, which enables faster and more accurate detection of overheat conditions in the generator. The integral design also eliminates the need for complex pipe and valve systems for transferring hydrogen away from a generator to a remote monitor site, which significantly reduces the risk of dangerous hydrogen leaks and the costs associated with installing and maintaining a remote condition monitor. By eliminating the need for complex pipe and valve systems, the integral design also reduces or eliminates the opportunity for water to collect and cause false alarms in the monitor.

These and other objects, features, and advantages in accordance with the present invention are provided in one aspect by a condition-monitoring system that includes a generator housing with an access opening with an access flange. A flange-mountable condition monitor is provided for mounting to the access flange. The condition monitor includes a hydrogen-side component and an air-side component separated by a barrier wall with a hermetically-sealed electrical throughway. The hermetically-sealed throughway permits electrical conductors to pass from the hydrogen-side component to the air-side component. The hydrogen-side component includes a detector means for detecting sub-micron particles in the generator's hydrogen that are indicative of an overheat condition. The air-side component comprises an input/output means for receiving signals from the detector means and for transmitting the signals to a remote location. A monitor housing is included for enclosing the input/output means.

BRIEF DESCRIPTION OF THE DRAWINGS

The invention is explained in more detail by way of example with reference to the following drawings.

DETAILED DESCRIPTION

Figure 1:
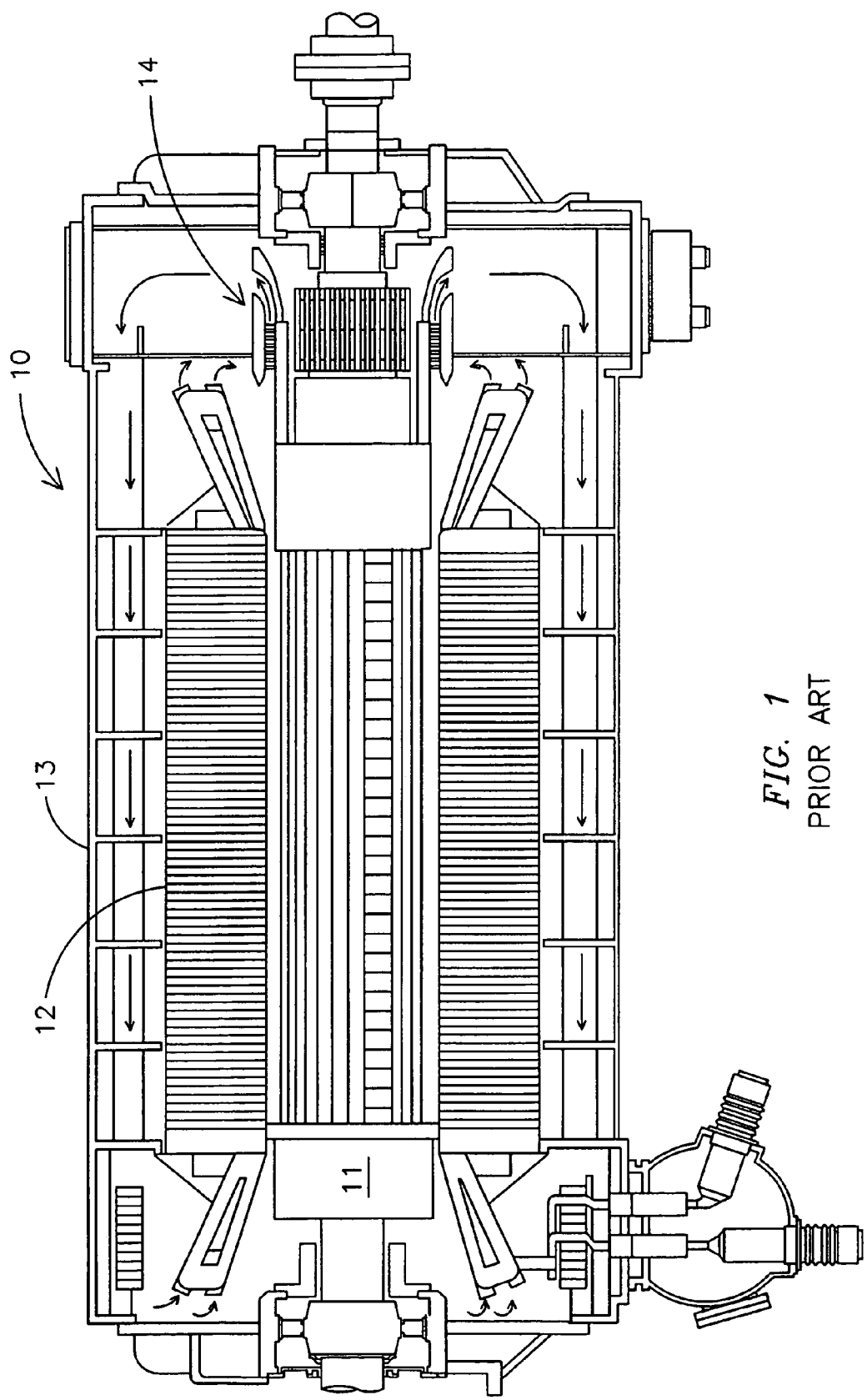
FIG. 1 illustrates a sectional view of a conventional hydrogen-cooled generator.
Figure 2:
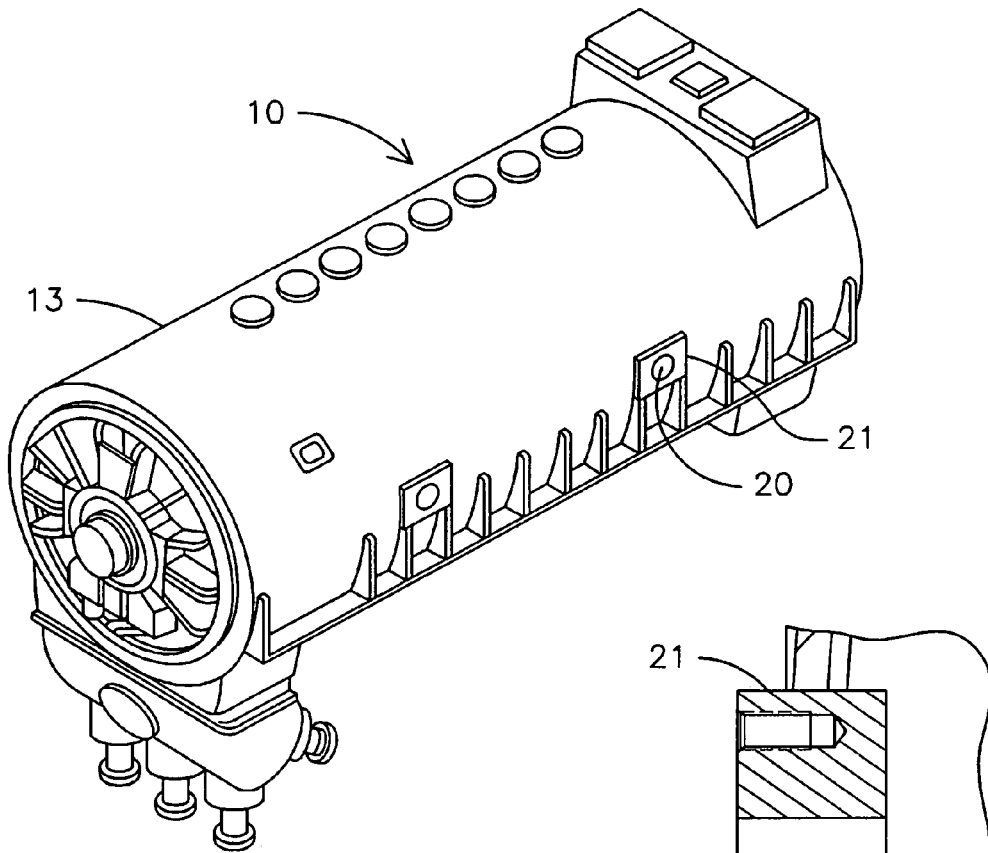
FIG. 2 illustrates an exterior view of a hydrogen-cooled generator consistent with an exemplary embodiment of the present invention.

FIG. 2 illustrates a hydrogen-cooled generator consistent with an exemplary embodiment of the present invention. The generator is enclosed by a housing 13. One or more access openings 20 are included in the housing to provide operators with access to the inside of the generator 13. The access openings 20 include an access flange 21 for making connections to the access opening 20. The access openings 20 are generally located on the sides of the generator 13, but may be located at other locations that do not interfere with the operation of the generator 13. When the access openings are not in use, they are generally blanked off with a blanking plate, which is fastened to the access flange 21 to cover the access opening 20 to prevent hydrogen from escaping from the generator 10.

Figure 3A:
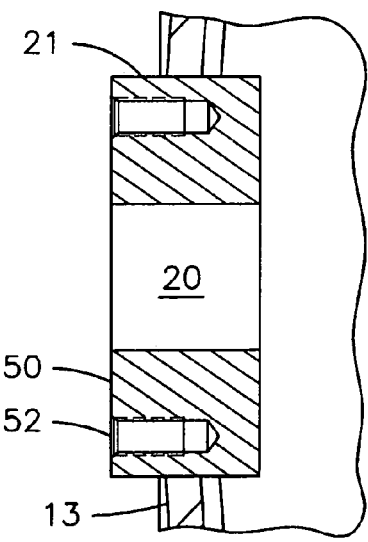
FIGS. 3A and 3B illustrate an access port and access flange consistent with an exemplary embodiment of the present invention.
Figure 3B:
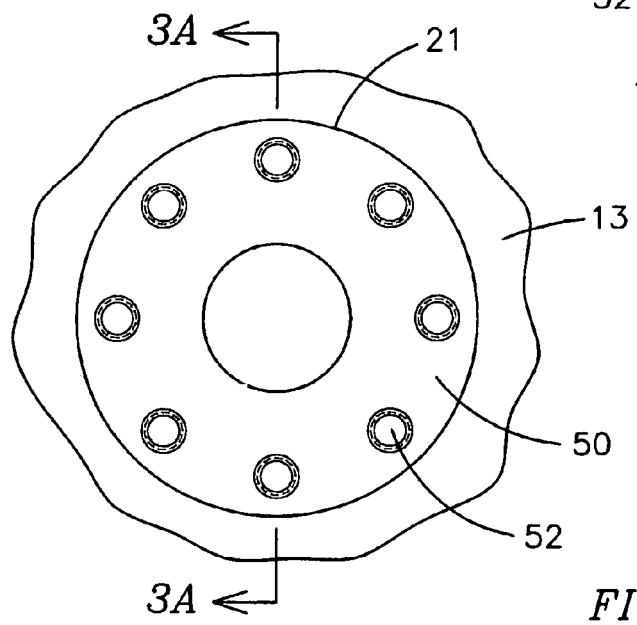

FIG. 3 illustrates an expanded view of an access opening 20 and access flange 21 consistent with an exemplary embodiment of the present invention. The access opening 20 and access flange 21 may be located in the housing 13 of the generator 10, as illustrated in FIG. 2, or in various other locations associated with the generator 10, such as a hydrogen dryer or a hydrogen cooler. One or more such openings and flanges are generally available for use in mounting a condition monitor consistent with the present invention. If a preexisting, unused opening is not available, a new opening and flange can generally be installed. The access flange 21 illustrated in FIG. 3 includes a smooth mating surface 50 for a mating flange abut against. One or more bolt holes 52 are also provided in the mating surface 50 to accept bolts for fastening a mating flange to the access flange 21.

Figure 4:
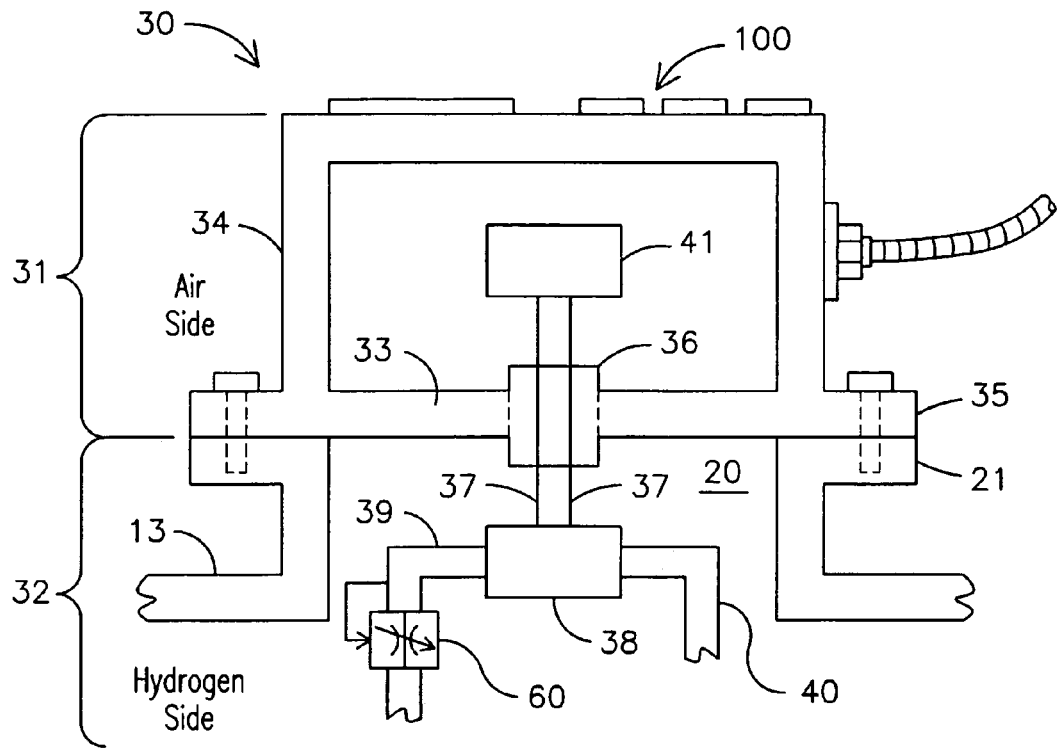
FIG. 4 illustrates a condition monitor consistent with an exemplary embodiment of the present invention.
Figure 5:
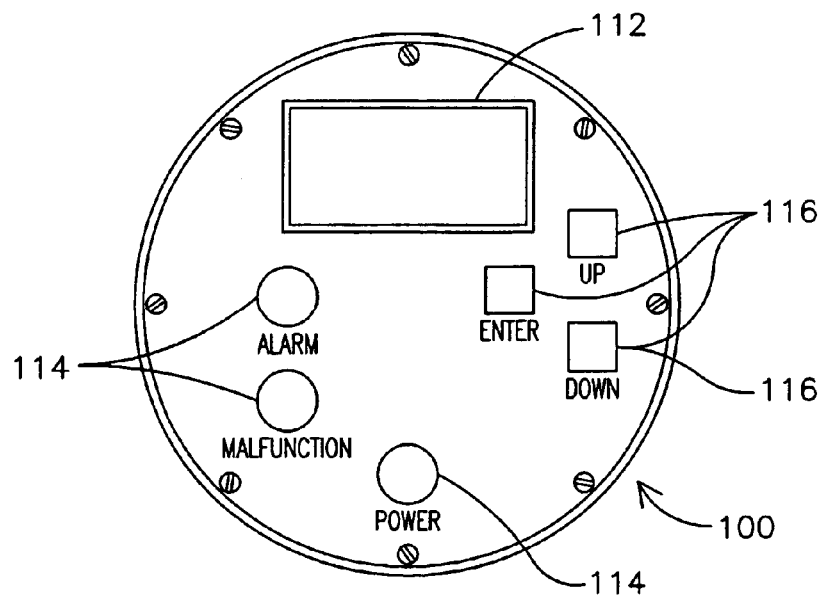
FIG. 5 illustrates a display panel consistent with an exemplary embodiment of the present invention.

FIG. 4 illustrates a flange-mounted condition monitor 30 consistent with an exemplary embodiment of the present invention. The condition monitor 30 is mounted to an access flange 21 to form an integral part of the generator. The condition monitor 30 includes an air-side component 31 and a hydrogen-side component 32. The air-side component 31 and the hydrogen-side component 32 are separated by a barrier wall 33. The barrier wall 33 covers the access opening 20 to prevent hydrogen from escaping form the generator. The barrier wall includes a hermetically-sealed throughway 36 for passing electrical conductors 37 from the hydrogen-side component 32 to the air-side component 31, without permitting hydrogen to pass. The electrical conductors 37 may be, for example, copper wires or tin plated wires or any conductor that sufficiently dissolves into the insulating substrate of the throughway 36 to form a hermetic seal. A monitor housing 34 is provided to enclose the elements of the air-side component 31. The monitor housing 34 includes a monitor flange 35 for coupling the condition monitor 30 to the access flange 21.

The air-side component 31 includes the various elements of the condition monitor 30 that are not exposed to hydrogen. They air-side component 31 may include, for example, an input/output device 41 for receiving electrical signals from the detector 38 and transmitting the signals to a remote location over a wireless or hardwired communications channel. The input/output device 41 may include, for example, an input/output terminal strip, relay closures, amplifiers, logic devices, a pulse width modulator, and/or one or more microprocessors. The air-side component 31 may include an amplifier module for amplifying signals received from the hydrogen-side component 32. The air-side component 31 may also include a display panel 100 that includes, for example, an LCD screen 112, alarm, malfunction and power indicator lights 114, and input keys or knobs 116.

The hydrogen-side component 32 includes the various components in the condition monitor 30 that may be exposed to the hydrogen within the generator. The hydrogen-side component 32 includes a detector 38 for detecting pyrolytic products in the hydrogen within the generator that are indicative of an overheat condition. The detector may be, for example, an ion chamber detector that includes a radioactive beta source cathode and anode collector. The detector 38 includes an inlet 39 for capturing samples of hydrogen from within the generator and an outlet 40 for returning the samples to the generator. The hydrogen side component 32 may also include a closed-loop flow control 60 inline with the detector 38 to maintain the flow of hydrogen through the detector 38 at a substantially constant rate in order to improve the accuracy and predictability of the condition monitor 30.

When the detector 38 detects pyrolytic products in the hydrogen in the generator, the detector 38 transmits an analog electrical signal to the input/output device 41 over the electrical conductors 37 indicating the particulate level in the hydrogen and whether an overheat condition has occurred. The input/output device 41 may then communicate the overheat condition to an operator or to a data processing system at a remote location. Because the detector 38 and its inlet 39 are located in the hydrogen-side component within the generator, the detector can detect and, respond to an overheat condition significantly faster than conventional monitors and with much less chance of false indications. Flange-mounted condition monitors consistent with the present invention also eliminate the need for complex, specially-designed systems of pipes and valves for conveying hydrogen samples to a remote location, significantly reducing the costs associated with a condition monitor and significantly increasing the level of safety and eliminating the need for explosion-proof enclosures for the remote electronics.

Condition monitors consistent with the present invention may also include a means for injecting test particles into the stream of hydrogen entering the detector 38. The means may include, for example, an electrically controlled heating device for heating a sacrificial material. When the heating device heats the sacrificial material, a controlled amount of pyrolytic particles are products, permitting verification of the operation of the condition monitor.

The present invention has been described with reference to the accompanying drawings that illustrate a preferred embodiment of the invention. The invention may, however, be embodied in many different forms and should not be construed as limited to the embodiment set forth herein. For example, the condition monitor of the present invention may be mounted in alternate locations such as on a generator's hydrogen dryer or a generator's hydrogen coolers. The exemplary embodiment is provided so that this disclosure will be thorough and complete, and will fully convey the scope of the invention to those skilled in the art. The scope of the invention should be determined based upon the appended claims and their legal equivalents, rather than the specific embodiment described above.

What is claimed is:

1. A condition monitoring system for detecting an overheat condition in a hydrogen-cooled electric generator, comprising:
    a generator housing for containing hydrogen within said electric generator, said housing having an access opening with an access flange; and
    a flange-mountable condition monitor comprising a hydrogen-side component and an air-side component separated by a barrier wall having a hermetically-sealed throughway for passing electrical conductors from said hydrogen-side component to said air-side component;
    wherein said hydrogen-side component comprising a detector means for detecting sub-micron particles in said hydrogen indicative of said overheat condition; and
    said air-side component comprising an input/output means for receiving signals from said detector means and for transmitting said signals to a remote location, and a monitor housing for enclosing said input/output means.

2. The condition monitoring system of claim 1 wherein said detector means comprises an ion chamber detector.

3. The condition monitoring system of claim 2 wherein said detector means includes an inlet filter for filtering contaminants larger than said sub-micron particles from said hydrogen before entering said detector means.

4. The condition monitoring system of claim 3 wherein said detector means further comprises an outlet comprising a conduit for conducting hydrogen to a low pressure region in said generator housing.

5. The condition monitoring system of claim 4 wherein said input/output means includes means for processing said signals received from said detector means and for providing an alarm signal to said remote location.

6. The condition monitoring system of claim 5 further comprising a closed-loop flow control connected inline with said detector for maintaining a substantially constant flow through said detector.

7. A flange-mountable condition monitor for detecting an overheat condition in a hydrogen-cooled electric generator, comprising:

a mounting flange adapted to abut and connect to an access flange of said electric generator; and a hydrogen-side component and an air-side component separated by a barrier wall having a hermetically-sealed throughway for passing electrical conductors from said hydrogen-side component to said air-side component;

wherein said hydrogen-side component comprising a detector means for detecting sub-micron particles in said hydrogen indicative of said overheat condition; and said air-side component comprising an input/output means for receiving signals from said detector means and for transmitting said signals to a remote location, and a monitor housing for enclosing said input/output means.

8. The flange-mountable condition monitor of claim 7 wherein said detector means comprises an ion chamber detector.

9. The flange-mountable condition monitor of claim 8 wherein said detector means includes an inlet filter for filtering contaminants larger than said sub-micron particles from said hydrogen before entering said detector means.

10. The flange-mountable condition monitor of claim 9 wherein detector means further comprises an outlet comprising a conduit for conducting hydrogen to a low pressure region in said generator housing.

11. The flange-mountable condition monitor of claim 10 wherein said input/output means includes means for processing said signals received from said detector means and for providing an alarm signal to said remote location.

12. The flange-mountable condition monitor of claim 11 wherein said electrical conductors comprise copper wires.

13. A condition monitoring system for detecting an overheat condition in a hydrogen-cooled electric generator, comprising:

a mounting flange adapted to abut and connect to an access flange of said electric generator; and a flange-mountable condition monitor comprising a hydrogen-side component and an air-side component separated by a barrier wall having a hermetically-sealed throughway for passing electrical conductors from said hydrogen-side component to said air-side component;

said hydrogen-side component comprising a detector for detecting sub-micron particles in said hydrogen indicative of said overheat condition; and said air-side component comprising an input/output circuit for receiving signals from said detector and for transmitting said signals to a remote location, and a monitor housing for enclosing said input/output device.

14. The condition monitoring system of claim 13 wherein said detector comprises an ion chamber detector.

15. The condition monitoring system of claim 14 wherein said detector includes an inlet filter for filtering contaminants larger than said sub-micron particles from said hydrogen before entering said detector.

16. The condition monitoring system of claim 15 wherein said detector further comprises an outlet comprising a conduit for conducting hydrogen to a low pressure region in said generator housing.

17. The condition monitoring system of claim 16 wherein said input/output circuit includes means for processing said signals received from said detector means and for providing an alarm signal to said remote location.

18. The condition monitoring system of claim 14 further comprising a closed-loop flow control connected inline with said ion chamber detector for maintaining a substantially constant flow through said ion chamber detector.

19. The condition monitoring system of claim 13 wherein said access flange is located on a hydrogen shell of said electric generator.

20. The condition monitoring system of claim 13 wherein said access flange is located on a hydrogen dryer of said electric generator.

21. The condition monitoring system of claim 13 wherein said access flange is located on a hydrogen cooler of said electric generator.

22. The condition monitoring system of claim 13 further comprising means for injecting test particulates into a stream of hydrogen entering said detector means for testing the operation of said condition monitoring system.

* * * * *